March 17, 1942. P. B. REEVES 2,277,004
SHIFTING MEANS FOR VARIABLE SPEED DRIVE
Filed Nov. 9, 1940 2 Sheets-Sheet 1

INVENTOR.
Paul B. Reeves,
BY Hood & Hahn
ATTORNEYS

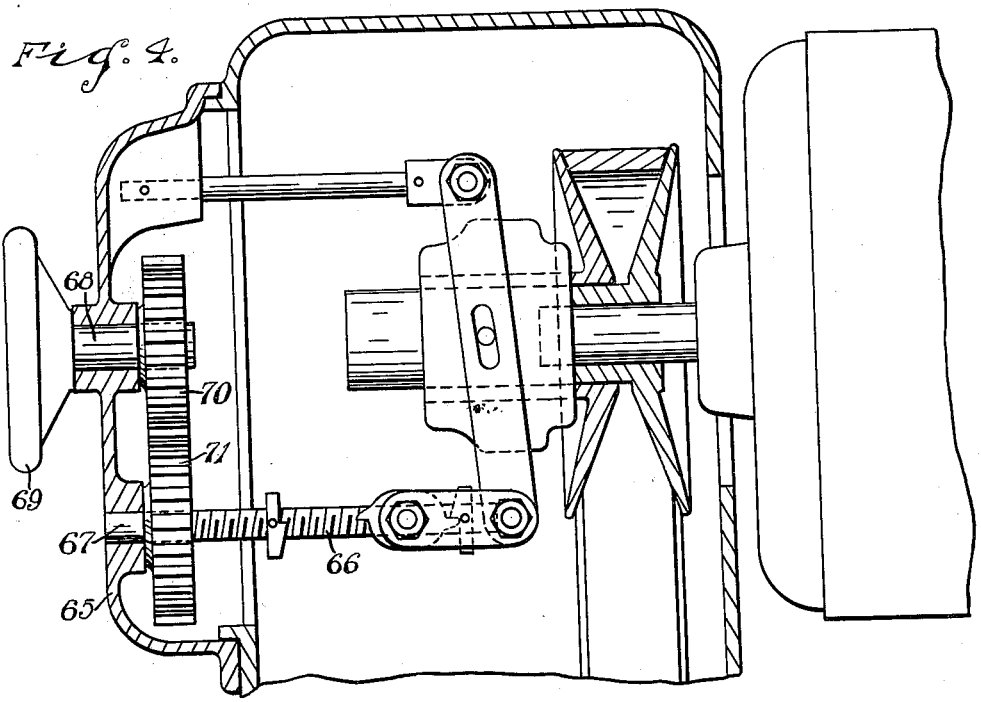
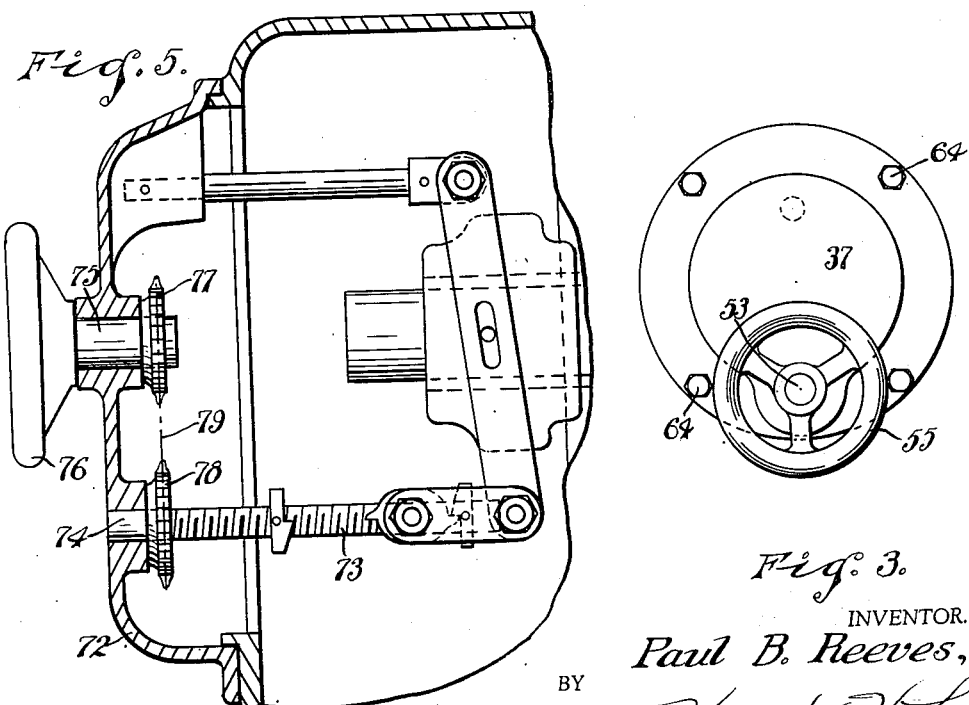

Patented Mar. 17, 1942

2,277,004

UNITED STATES PATENT OFFICE 2,277,004

SHIFTING MEANS FOR VARIABLE SPEED DRIVE

Paul B. Reeves, Columbus, Ind., assignor to Reeves Pulley Company, Columbus, Ind., a corporation of Indiana Application November 9, 1940, Serial No. 364,991

9 Claims. (Cl. 74—230.17)

The present invention relates to variable speed drives, and is most particularly concerned with improvements in the mechanism for adjusting the speed ratio of such drives.

One form of variable speed drive comprises a casing outside of which is mounted an electric motor having a spindle projecting into the casing. On the spindle, within the casing, is mounted a pulley of the expansible V-type, one coned disc of which is fixed to the motor spindle, while the other disc thereof is positively shiftable axially toward and away from its fellow. Upon an axis parallel with the motor spindle axis, there is suitably mounted within the casing a driven shaft carrying a V-pulley having one disc fixed to the shaft while the other disc is shiftable toward and away from its fellow, being constantly spring-urged toward its fellow. Means is provided for positively shifting the axially movable disc of the driving V-pulley; and one form of that structure which has given satisfactory service for a number of years is illustrated in my prior Patent No. 2,089,711, issued August 10, 1937.

In that form, the shiftable disc of the driving pulley carries, on its hub, a thrust bearing, upon the housing of which is secured an equalizer ring capable of oscillation about a diametrical axis. A closure plate for an aperture in the casing carries a screw shaft journalled for rotation in the closure but held against reciprocation with respect thereto; and a nut threadedly mounted on that shaft carries a yoke, the arms of which are connected to the equalizer ring through a pivotal connection upon an axis coplanar with the axis of oscillation of the equalizer ring but perpendicular thereto.

While the above-described structure, disclosed in my said prior Patent 2,089,711 is such as to permit slight misalignments between the motor spindle and the screw shaft, nevertheless considerable care must be exercized in assembling the drive to bring the motor spindle and the screw shaft into at least substantial coaxiality. If this is not done, excessive wear takes place, particularly in the thrust bearing for the shiftable disc.

It is the primary object of the present invention to do away with the necessity for that close alignment by providing a different kind of adjusting mechanism.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 3 is a reduced elevation of the closure member of Fig. 1;

Fig. 4 is a fragmental section similar to the section of Fig. 1, but showing a somewhat modified form of adjusting mechanism; and Fig. 5 is a fragmental view similar to Fig. 4, but showing a still further form of my invention.

Figures 1, 2:
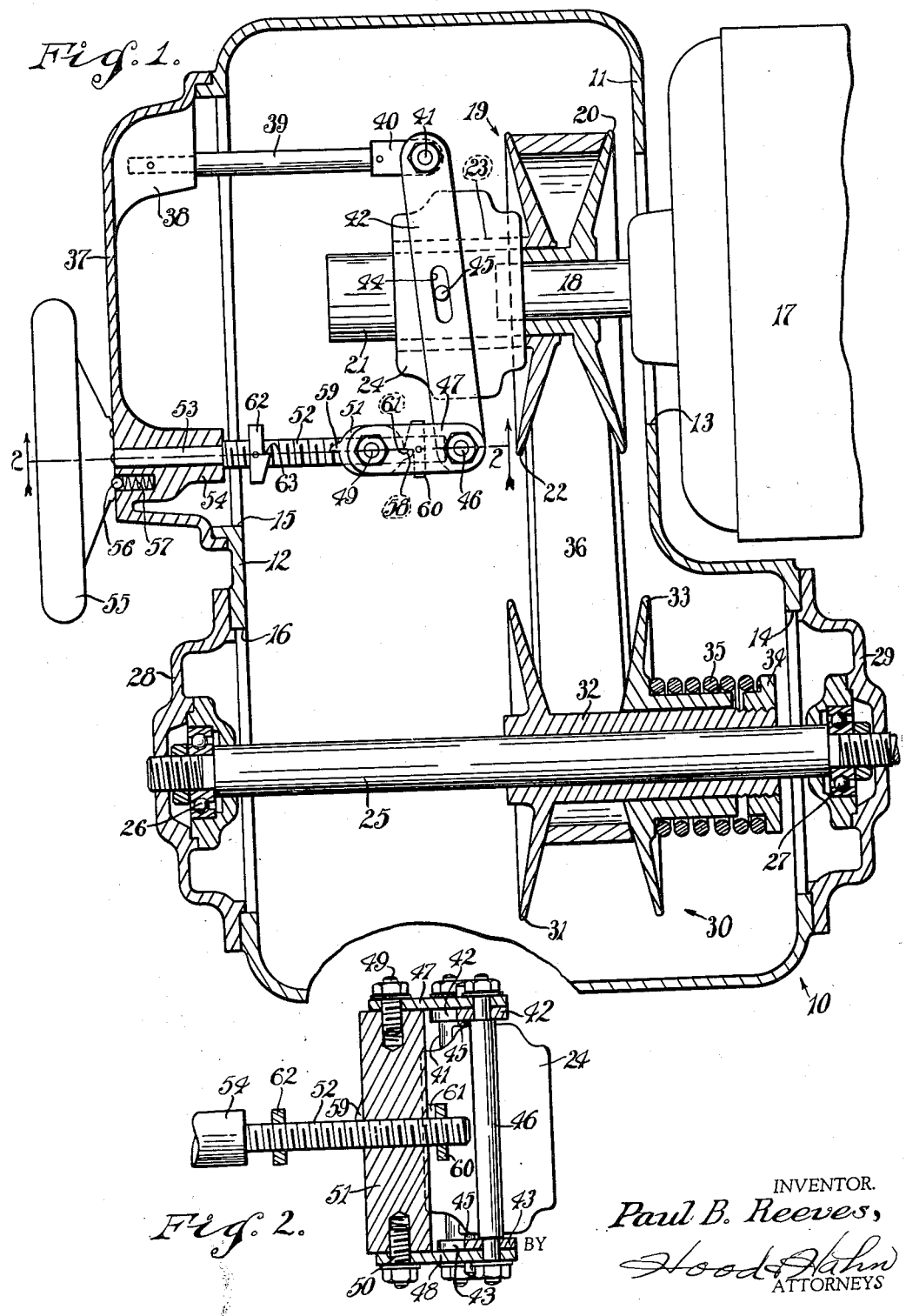
Fig. 1 is a longitudinal section through a drive of the type here under consideration, showing one form of improved adjusting means.
Fig. 2 is a horizontal section taken substantially on the line 2—2 of Fig. 1.

Referring more particularly to Figs. 1, 2, and 3 of the drawings, it will be seen that I have illustrated a casing 10 of conventional form including opposed walls 11 and 12. The wall 11 is formed with apertures 13 and 14, while the wall 12 is formed with apertures 15 and 16, the apertures 15 and 16 being respectively concentric with the apertures 13 and 14. As is clearly illustrated, the aperture 15 is large enough to permit passage therethrough of any one of the discs incorporated in the drive.

An electric motor 17 is suitably mounted outside the casing, with its spindle 18 projecting through the aperture 13 into the casing. Mounted upon the spindle 18 within the casing is an expansible V-pulley indicated generally by the reference numeral 19. This pulley comprises a coned disc 20 having an elongated hub 21 projecting from the coned face thereof, said disc being secured, in any desired manner, against movement with respect to the spindle 18. Slidably mounted upon the hub 21, but suitably held against rotation with respect thereto is a mating disc 22 having a hub 23. A non-rotatable element 24, which may be a bearing housing, is carried upon the hub 23, and, in any suitable manner, as for instance through the medium of a thrust bearing, is fixed against axial movement with respect to the disc 22, while permitting free rotation of the disc 22 with respect to the element 24.

A driven shaft 25 is suitably journalled in bearings 26 and 27, preferably carried by cover plates 28 and 29 for the casing apertures 16 and 14, respectively, said shaft 25 being substantially parallel with the motor spindle 18. A driven V-pulley, indicated generally by the reference numeral 30, is mounted on the driven shaft 25, the coned disc 31 being fixed to the shaft 25 and provided with an elongated hub 32 projecting from its coned face. Slidably but non-rotatably mounted upon the hub 32 is a mating coned disc 33. Beyond the disc 33, there is threaded to the hub 32 a nut 34 constituting an abutment for one end of a coiled spring 35, the opposite end of which bears against the disc 33, constantly urging the same toward the disc 31. An endless belt 36 provides a driving connection between the pulleys 19 and 30; and it will be obvious that the speed ratio between the spindle 18 and the shaft 25 may be varied by shifting the disc 22, which results in corresponding movement of the disc 33 either in response to, or in opposition to, the influence of the spring 35. Drives of this character have long been well known.

A closure 37 for the aperture 15 is provided with a lug 38 in which is fixed a post 39 terminating in an abutment 40 which provides a pivot bar 41 for one end of each of two levers 42 and 43. Each of said levers is formed, intermediate its ends, with a slot 44 embracing a pin 45 on the non-rotatable member 24. At its lower end, each of the levers 42 and 43 is pivotally secured to a shouldered rod 46, most clearly illustrated in Fig. 2; and to the ends of said rod are likewise pivotally secured one end of each of two links 47 and 48. The opposite end of the link 47 is pivotally secured to a pin 49 on a nut 51, while the opposite end of the link 48 is similarly pivotally secured to a pin 50 at the opposite end of the said nut 51.

Thus, the levers 42 and 43 provide an operative connection between the nut 51 and the non-rotatable member 24, and likewise act to prevent rotation of the nut 51.

The nut 51 is threadedly mounted upon a screw shaft 52 which is provided with an unthreaded portion 53 journalled in a second lug 54 formed on the inside surface of the closure 37. Said unthreaded portion 53 of the screw shaft 52 projects entirely through the closure 37, and carries a hand wheel 55 outside said closure. Preferably, the hand wheel is provided with notches for cooperation with a clicker ball 56 which is under the influence of a spring 57.

It will be clear that rotation of the hand wheel 55 in a clockwise direction, as viewed in Fig. 3, will result in movement of the nut 51 toward the left from the position illustrated in Fig. 1. That movement will swing the levers 42 and 43 in a clockwise direction about the pivot bar 41, to move the disc 22 away from the disc 20. Such movement will permit the belt 36 to move inwardly between the discs 20 and 22, under the influence of the spring 35 which constantly presses the disc 33 toward the disc 31, thus tending to squeeze the belt 36 outwardly between said discs. Such adjustment of the belt 36 will, of course, result in a reduction in the speed of the shaft 25.

It will be noted that the nut 51 is formed with oppositely projecting fingers 58 and 59. Adjustably secured to the screw shaft 52 are two stop elements 60 and 62, said stop elements being provided, respectively, with oppositely facing stop shoulders 61 and 63. As the nut 51 approaches the element 62, the finger 59 will engage against the stop face 63 before the nut 51 comes into contact with the adjacent vertical face of the element 62, thereby preventing any jamming of the nut against its stop element.

Because of the lost motion type of connection between the levers 42 and 43 and the non-rotatable element 24, there is no necessity for perfect alignment, or even substantially perfect alignment, of any element with the spindle 18.

Furthermore, the eccentric mounting of the hand wheel 55 with respect to the spindle 18 produces a new function, in that the hand wheel may be positioned in any one of a plurality of desired locations with respect to the rest of the unit. Referring to Fig. 3, it will be seen that the closure 37 is secured in place on the casing 10 through the medium of four equidistantly spaced bolts 64. The general contour of the closure 37 is circular, so that it may be rotated about an axis substantially coaxial with the spindle 18; and it may be fastened in place in any one of four selective positions of rotation. Obviously, the relationship between the parts carried by the closure and the element 24 is not disturbed by such adjustment, although the element 24 will be rotationally shifted with respect to its disc 22.

It will likewise be seen that, if the closure 37 is removed from the casing, the post 39 and screw shaft 52 will likewise be removed and will carry with them the nut 51, the levers 42 and 43, the element 24, and the disc 22. Thus, the belt 36 is released for ready removal through one of the apertures 14 or 15.

The organization of Fig. 4 differs somewhat from that of Fig. 1. In Fig. 4, the closure 65 provides a journal mounting for the screw shaft 66, the unthreaded portion 67 of which does not project beyond the outer surface of the closure 65. A stub shaft 68 is suitably journalled in the closure 65 at any desired position, as, for instance, in a position substantially coaxial with the motor spindle, and carries a hand wheel outside the closure. Within the closure, shaft 68 carries a pinion 70 meshing with a gear 71 fixed to the screw shaft 66, so that rotation of the hand wheel 69 will result in opposite rotation of the screw shaft 67. Obviously, although I have shown the gears 70 and 71 of equal pitch diameters, they could readily be made of any desired differential pitch diameters.

In Fig. 5, the closure 72 is shown as providing a journal mounting for the screw shaft 73, the unthreaded portion 74 of which does not project beyond the outer surface of the closure. A stub shaft 75 is journal mounted in the closure 72 in any desired position, and carries a hand wheel 76 outside the closure. Inside the closure, the stub shaft 75 carries a sprocket 77, drivingly connected to a sprocket 78 on the screw shaft 73 through the medium of a chain 79.

In all other respects, the embodiments illustrated in Figs. 4 and 5 are identical with the structure illustrated in Fig. 1.

I claim as my invention:

1. In a device of the class described, a casing, substantially aligned apertures in opposite walls of said casing, a motor mounted outside said casing and having a spindle projecting through one of said apertures into said casing and substantially centered in said one aperture, an expansible V-pulley mounted on said spindle within said casing and comprising a coned disc fixed with respect to said spindle and a mating coned disc axially shiftable with respect to said spindle, a non-rotatable element axially fixed with respect to said shiftable disc, a closure for the other of said apertures, an abutment carried by said closure and projecting into proximity to said non-rotatable element, a lever pivoted on said abutment and operatively connected to said non-rotatable element, a screw shaft rotatably carried by said closure, said screw shaft being positioned on the opposite side of said non-rotatable element from the pivotal axis of said lever, and means providing an operative connection between said screw shaft and said lever for converting rotation of said screw shaft into swinging movement of said lever, and said closure and the elements carried thereby being adjustable substantially about the axis of said spindle and including means for securing said closure to said casing in any one of a plurality of adjusted positions.

2. In a device of the class described, a casing, substantially aligned apertures in opposite walls of said casing, a motor mounted outside said casing and having a spindle projecting through one of said apertures into said casing and substantially centered in said one aperture, an expansible V-pulley mounted on said spindle within said casing and comprising a coned disc fixed with respect to said spindle and a mating coned disc axially shiftable with respect to said spindle, a non-rotatable element axially fixed with respect to said shiftable disc, a closure for the other of said apertures, an abutment carried by said closure and projecting into proximity to said non-rotatable element, a lever pivoted on said abutment and operatively connected to said non-rotatable element, a screw shaft rotatably carried by said closure and projecting into proximity to said non-rotatable element, a nut threadedly mounted on said screw shaft, and a link providing an operative connection between said nut and said lever and holding said nut against rotation, whereby rotation of said screw shaft results in swinging movement of said lever.

3. In a device of the class described, a casing, substantially aligned apertures in opposite walls of said casing, a motor mounted outside said casing and having a spindle projecting through one of said apertures into said casing and substantially centered in said one aperture, an expansible V-pulley mounted on said spindle within said casing and comprising a coned disc fixed with respect to said spindle and a mating coned disc axially shiftable with respect to said spindle, a non-rotatable element axially fixed with respect to said shiftable disc, a closure for the other of said apertures, an abutment carried by said closure and projecting into proximity to said non-rotatable element, a lever pivoted on said abutment and operatively connected to said non-rotatable element, a screw shaft rotatably carried by said closure and projecting into proximity to said non-rotatable element, a nut threadedly mounted on said screw shaft, a link providing an operative connection between said nut and said lever and holding said nut against rotation, whereby rotation of said screw shaft results in swinging movement of said lever, two members fixed on said screw shaft, one on each side of said nut, each of said members being formed with an abutment shoulder, and a finger fixed to each side of said nut, the shoulder on each of said members engaging a finger on said nut, as said nut approaches the member, to arrest rotation of said shaft before the face of said nut engages the adjacent face of said member.

4. In a device of the class described, a casing, substantially aligned apertures in opposite walls of said casing, a motor mounted outside said casing and having a spindle projecting through one of said apertures into said casing and substantially centered in said one aperture, an expansible V-pulley mounted on said spindle within said casing and comprising a coned disc fixed with respect to said spindle and a mating coned disc axially shiftable with respect to said spindle, a non-rotatable element axially fixed with respect to said shiftable disc, a closure for the other of said apertures, an abutment carried by said closure and projecting into proximity to said non-rotatable element, a lever pivoted on said abutment and operatively connected to said non-rotatable element, a screw shaft having an unthreaded portion journalled in a bore in said closure and having its threaded portion projected into proximity with said lever, said bore being eccentric with respect to said spindle, a handwheel fixed to said unthreaded portion of said screw shaft outside said closure, and means providing an operative connection between said screw shaft and said lever for converting rotation of said screw shaft into swinging movement of said lever, and said closure and the elements carried thereby being adjustable substantially about the axis of said spindle and including means for securing said closure to said casing in any one of a plurality of adjusted positions.

5. In a device of the class described, a casing, substantially aligned apertures in opposite walls of said casing, a motor mounted outside said casing and having a spindle projecting through one of said apertures into said casing and substantially centered in said one aperture, an expansible V-pulley mounted on said spindle within said casing and comprising a coned disc fixed with respect to said spindle and a mating coned disc axially shiftable with respect to said spindle, a non-rotatable element axially fixed with respect to said shiftable disc, a closure for the other of said apertures, an abutment carried by said closure and projecting into proximity to said non-rotatable element, a lever pivoted on said abutment and operatively connected to said non-rotatable element, a screw shaft rotatably carried by said closure and projecting into proximity with said lever, said screw shaft being eccentric with respect to said spindle, a shaft journalled in said closure, a handwheel fixed to said shaft outside said closure, means providing a driving connection between said shaft and said screw shaft, and means providing an operative connection between said screw shaft and said lever for converting rotation of said screw shaft into swinging movement of said lever.

6. In a device of the class described, a casing, substantially aligned apertures in opposite walls of said casing, a motor mounted outside said casing and having a spindle projecting through one of said apertures into said casing and substantially centered in said one aperture, an expansible V-pulley mounted on said spindle within said casing and comprising a coned disc fixed with respect to said spindle and a mating coned disc axially shiftable with respect to said spindle, a non-rotatable element axially fixed with respect to said shiftable disc, a closure for the other of said apertures, an abutment carried by said closure and projecting into proximity to said non-rotatable element, a lever pivoted on said abutment and operatively connected to said non-rotatable element, a screw shaft rotatably carried by said closure and projecting into proximity with said lever, said screw shaft being eccentric with respect to said spindle, a shaft journalled in said closure, a handwheel fixed to said shaft outside said closure, means inside said closure providing a driving connection between said shaft and said screw shaft, and means providing an operative connection between said screw shaft and said lever for converting rotation of said screw shaft into swinging movement of said lever.

7. In a device of the class described, a casing, substantially aligned apertures in opposite walls of said casing, a motor mounted outside said casing and having a spindle projecting through one of said apertures into said casing and substantially centered in said one aperture, an expansible V-pulley mounted on said spindle within said casing and comprising a coned disc fixed with respect to said spindle and a mating coned disc axially shiftable with respect to said spindle, a non-rotatable element axially fixed with respect to said shiftable disc, a closure for the other of said apertures, an abutment carried by said closure and projecting into proximity to said non-rotatable element, a lever pivoted on said abutment and operatively connected to said non-rotatable element, a screw shaft rotatably carried by said closure and projecting into proximity with said lever, said screw shaft being eccentric with respect to said spindle, a shaft journalled in said closure substantially coaxial with said spindle, a handwheel fixed to said shaft outside said closure, means providing a driving connection between said shaft and said screw shaft, and means providing an operative connection between said screw shaft and said lever for converting rotation of said screw shaft into swinging movement of said lever.

8. In a device of the class described, a casing, substantially aligned apertures in opposite walls of said casing, a motor mounted outside said casing and having a spindle projecting through one of said apertures into said casing and substantially centered in said one aperture, an expansible V-pulley mounted on said spindle within said casing and comprising a coned disc fixed with respect to said spindle and a mating coned disc axially shiftable with respect to said spindle, a non-rotatable element axially fixed with respect to said shiftable disc, a closure for the other of said apertures, an abutment carried by said closure and projecting into proximity to said non-rotatable element, a lever pivoted on said abutment and operatively connected to said non-rotatable element, a screw shaft rotatably carried by said closure and projecting into proximity with said lever, said screw shaft being eccentric with respect to said spindle, a shaft journalled in said closure, a pinion fixed on said shaft, a gear fixed on said screw shaft and meshing with said pinion, a handwheel fixed to said shaft outside said closure, and means providing an operative connection between said screw shaft and said lever for converting rotation of said screw shaft into swinging movement of said lever.

9. In a device of the class described, a casing, subtantially aligned apertures in opposite walls of said casing, a motor mounted outside said casing and having a spindle projecting through one of said apertures into said casing and substantially centered in said one aperture, an expansible V-pulley mounted on said spindle within said casing and comprising a coned disc fixed with respect to said spindle and a mating coned disc axially shiftable with respect to said spindle, a non-rotatable element axially fixed with respect to said shiftable disc, a closure for the other of said apertures, an abutment carried by said closure and projecting into proximity to said non-rotatable element, a lever pivoted on said abutment and operatively connected to said non-rotatable element, a screw shaft rotatably carried by said closure and projecting into proximity with said lever, said screw shaft being eccentric with respect to said spindle, a shaft journalled in said closure, a sprocket fixed on said shaft, a sprocket fixed on said screw shaft, a chain providing a driving connection between said sprockets, a handwheel fixed on said shaft outside said closure, and means providing an operative connection between said screw shaft and said lever for converting rotation of said screw shaft into swinging movement of said lever.

PAUL B. REEVES.